(12) United States Patent
Morishima et al.

(10) Patent No.: US 12,475,598 B2
(45) Date of Patent: Nov. 18, 2025

(54) IN-VEHICLE CAMERA CALIBRATION DEVICE, CONTROL DEVICE, AND PATTERN WITH BEACON

(71) Applicant: HITACHI ASTEMO, LTD., Hitachinaka (JP)

(72) Inventors: Kenta Morishima, Tokyo (JP); Tetsuya Yamada, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/553,258

(22) PCT Filed: Mar. 9, 2022

(86) PCT No.: PCT/JP2022/010226
§ 371 (c)(1),
(2) Date: Sep. 29, 2023

(87) PCT Pub. No.: WO2023/042429
PCT Pub. Date: Mar. 23, 2023

(65) Prior Publication Data
US 2024/0177347 A1    May 30, 2024

(30) Foreign Application Priority Data

Sep. 14, 2021 (JP) .................. 2021-149453

(51) Int. Cl.
*G06T 7/80* (2017.01)
*G01C 21/36* (2006.01)
(52) U.S. Cl.
CPC ............ *G06T 7/80* (2017.01); *G01C 21/3605* (2013.01); *G06T 2207/30252* (2013.01)
(58) Field of Classification Search
CPC ..................... G06T 7/80; G06T 7/85
See application file for complete search history.

(56) References Cited

U.S. PATENT DOCUMENTS 6,787,750 B1 * 9/2004 Sauer ........................ G06T 7/73
250/559.4
10,165,264 B1 * 12/2018 Pratt .................... H04N 17/002
(Continued)

FOREIGN PATENT DOCUMENTS

EP    3 588 010 A1    1/2020
JP    2007-274564 A   10/2007

OTHER PUBLICATIONS

International Search Report with English Translation and Written Opinion of International Patent Application No. PCT/JP2022/010226 dated May 31, 2022 (8 pages).
(Continued)

*Primary Examiner* — Brian P Yenke
(74) *Attorney, Agent, or Firm* — Foley & Lardner LLP

(57) ABSTRACT

The present disclosure provides an in-vehicle camera calibration device, a control device, and a pattern-with-a-beacon capable of performing calibration of a camera mounted on a vehicle more accurately and easily. The in-vehicle camera calibration device 100 includes a control device 110 to be mounted on a vehicle 200 and a pattern-with-a-beacon 120 to be installed outside the vehicle 200. The pattern-with-a-beacon 120 includes a calibration pattern 121 captured by the camera 201 mounted on the vehicle 200 at the time of calibration, and a beacon 122 that transmits beacon information Ib by wireless communication. The control device 110 calibrates the camera 201 based on the pattern image Gp that is the image of the calibration pattern 121 acquired from the camera 201 and the beacon information Ib received through the receiving antenna 202 mounted on the vehicle 200.

7 Claims, 6 Drawing Sheets

(56) References Cited

U.S. PATENT DOCUMENTS

| | | | | |
|---|---|---|---|---|
| 10,621,753 | B2* | 4/2020 | Natroshvili | G06T 7/80 |
| 2003/0025788 | A1* | 2/2003 | Beardsley | G06T 17/00 |
| | | | | 348/43 |
| 2015/0178565 | A1* | 6/2015 | Rivlin | G06T 7/73 |
| | | | | 348/169 |
| 2016/0303973 | A1* | 10/2016 | Matsumoto | H04N 21/252 |
| 2016/0320951 | A1* | 11/2016 | Ernst | G06T 5/00 |
| 2018/0365859 | A1* | 12/2018 | Oba | B60W 40/114 |
| 2019/0259180 | A1* | 8/2019 | Tanaka | G01B 11/26 |
| 2020/0162724 | A1* | 5/2020 | Neser | G01S 19/01 |
| 2022/0180561 | A1* | 6/2022 | Hiraishi | G01S 13/931 |
| 2023/0035819 | A1* | 2/2023 | Kume | B60W 50/16 |
| 2023/0243657 | A1* | 8/2023 | Kiyohara | G08G 1/166 |
| | | | | 701/446 |
| 2024/0201315 | A1* | 6/2024 | Morishima | G08G 1/16 |
| 2024/0418855 | A1* | 12/2024 | Saito | G08G 1/09 |
| 2025/0076448 | A1* | 3/2025 | Imai | G01S 5/14 |

OTHER PUBLICATIONS

Japanese Office Action issued in corresponding JP Patent Application No. 2021-149453, dated Jun. 24, 2025 with English translation (6 pages).

* cited by examiner

IN-VEHICLE CAMERA CALIBRATION DEVICE, CONTROL DEVICE, AND PATTERN WITH BEACON

TECHNICAL FIELD

The present disclosure relates to an in-vehicle camera calibration device, a control device, and a pattern-with-a-beacon.

BACKGROUND ART

Conventionally, a calibration device has been known. The conventional calibration device described in PTL 1 includes an in-vehicle camera, a light emitting device, a marker photographing processing means, an image recognition processing means, and an attachment angle calculation processing means (PTL 1, Abstract, claim 1, paragraph 0008).

The light emitting device is attached to an in-vehicle camera and irradiates the ground to form a marker on the ground. The marker photographing processing means photographs the marker by an in-vehicle camera. The image recognition processing means recognizes a marker from an image of the marker. The attachment angle calculation processing means calculates an attachment angle of the camera based on the recognized marker.

According to this conventional calibration device, it is not necessary to manually set the position where the marker is to be formed, and not only the operation can be simplified but also the accuracy of correction can be enhanced (PTL 1, Abstract, paragraph 0009).

CITATION LIST

Patent Literature

PTL 1: JP 2007-274564 A

SUMMARY OF INVENTION

Technical Problem

As described above, the conventional calibration device causes the light emitting device to irradiate the ground to form a marker on the ground. Therefore, when deformation of the marker occurs due to the influence of unevenness or partial inclination of the ground, it becomes difficult to calculate the camera attachment angle based on the marker recognized from the image of the marker, and the accuracy of correction may be deteriorated.

The present disclosure provides an in-vehicle camera calibration device, a control device, and a pattern-with-a-beacon capable of performing calibration of a camera mounted on a vehicle more accurately and easily.

Solution to Problem

One aspect of the present disclosure is an in-vehicle camera calibration device including: a control device to be mounted on a vehicle; and a pattern-with-a-beacon to be installed outside the vehicle. The pattern-with-a-beacon includes: a calibration pattern to be captured by a camera mounted on the vehicle at a time of calibration, and a beacon configured to transmit beacon information by wireless communication. The control device calibrates the camera based on a pattern image being an image of the calibration pattern acquired from the camera and the beacon information received through a receiving antenna mounted on the vehicle.

Advantageous Effects of Invention

According to the one aspect of the present disclosure, it is possible to provide an in-vehicle camera calibration device, a control device, and a pattern-with-a-beacon capable of performing calibration of a camera mounted on a vehicle more accurately and easily.

DESCRIPTION OF EMBODIMENTS

Figure 1:
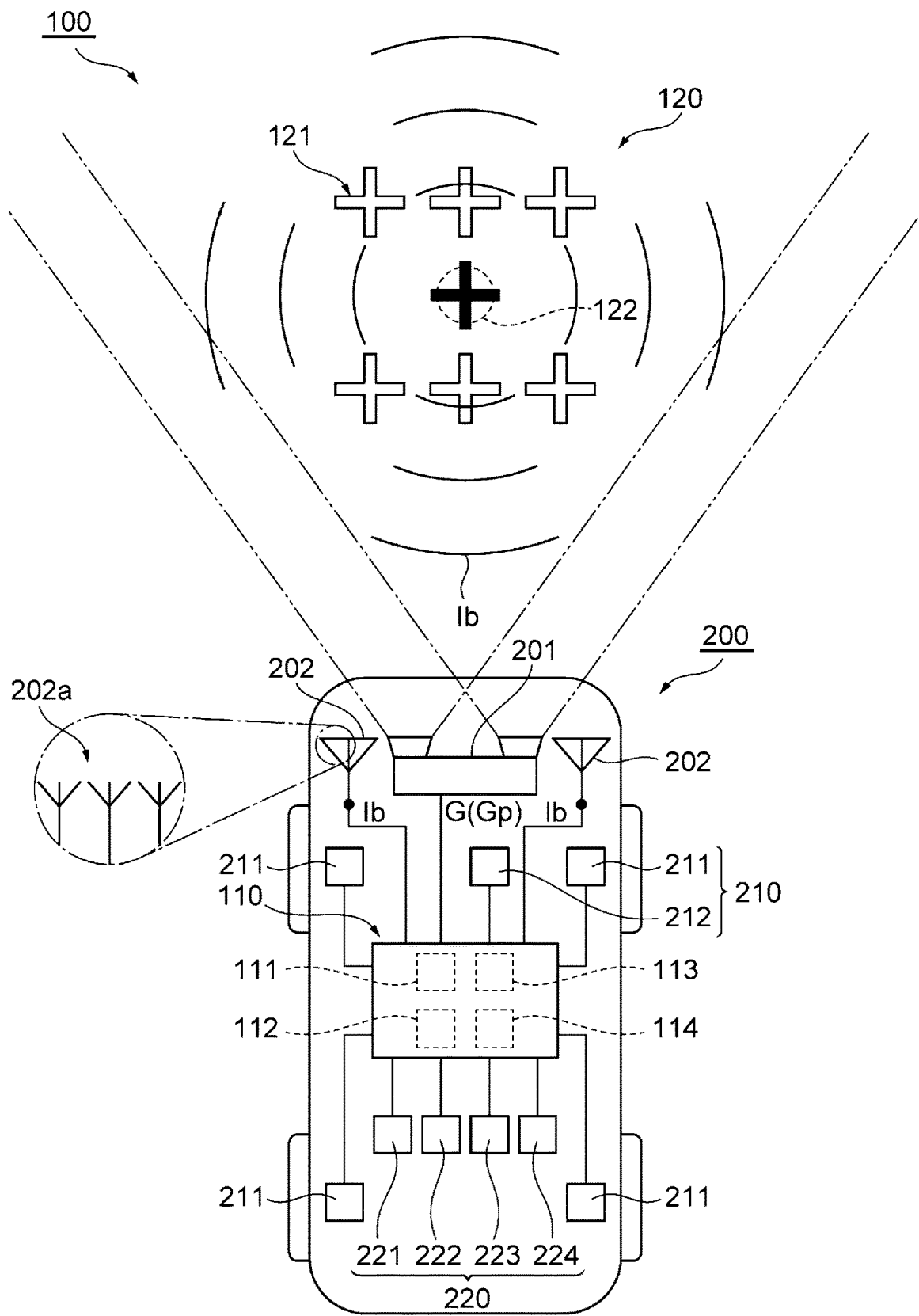
FIG. 1 is a schematic configuration diagram showing an embodiment of an in-vehicle camera calibration device according to the present disclosure.

Hereinafter, embodiments of an in-vehicle camera calibration device, a control device, and a pattern-with-a-beacon according to the present disclosure will be described with reference to the drawings. FIG. 1 is a schematic configuration diagram showing an embodiment of an in-vehicle camera calibration device, a control device, and a pattern-with-a-beacon according to the present disclosure.

The in-vehicle camera calibration device 100 of the present embodiment includes a control device 110 to be mounted on a vehicle 200 and a pattern-with-a-beacon 120 to be installed outside the vehicle 200. FIG. 1 shows one control device 110 mounted on one vehicle 200 and one pattern-with-a-beacon 120 positioned in front of the vehicle 200. It should be noted that the in-vehicle camera calibration device 100 can include a plurality of control devices 110 mounted on each of the plurality of vehicles 200 and a plurality of patterns-with-a-beacon 120 installed in various places such as a parking lot, a road, and an entrance/exit gate of a facility.

The control device 110 is, for example, an electronic control device (ECU) including an input/output unit 111, a central processing unit (CPU) 112, a memory 113 such as a ROM and a RAM, and a timer 114. The control device 110 can include, for example, one or more microcontrollers.

The vehicle 200 on which the control device 110 is mounted includes one or more cameras 201 and one or more receiving antennas 202. The vehicle 200 includes a vehicle sensor 210 and an actuator 220. The vehicle 200 is, for example, a gasoline vehicle, a diesel vehicle, an electric vehicle, a hybrid vehicle, or a fuel cell, and includes a drive system, a steering system, a braking system, an electrical system, a fuel supply system, and the like (not shown).

The camera 201 is, for example, an in-vehicle camera such as a monocular camera or a stereo camera, is attached to the vehicle 200, and is connected to the control device 110 through wiring. The camera 201 captures, for example, an object including a pedestrian, a vehicle, a road, and other obstacles in front of the vehicle 200, and outputs an image G to the control device 110. In addition, in addition to the camera 201, for example, the vehicle 200 includes an external sensor that detects an object around the vehicle 200, such as a millimeter wave radar, a laser radar, or an ultrasonic sensor (not shown).

The receiving antenna 202 receives, for example, beacon information Ib which is a radio wave transmitted from the beacon 122 of the pattern-with-a-beacon 120, and outputs the beacon information Ib to the control device 110. When the vehicle 200 includes a plurality of receiving antennas 202, each receiving antenna 202 includes, for example, an antenna array 202a including a plurality of antennas.

The vehicle sensor 210 detects a physical quantity of the vehicle 200 and outputs the physical quantity to the control device 110. The physical quantity of the vehicle 200 includes, for example, a speed, an acceleration, an angular velocity, an angular acceleration, a steering angle, a torque, an operation amount of an accelerator pedal, an operation amount of a brake pedal, and the like. The vehicle sensor 210 includes, for example, various sensors (not shown) in addition to the wheel speed sensor 211 and the steering angle sensor 212 shown in FIG. 1. In addition, the vehicle sensors 210 may include a receiver of a global navigation satellite system (GNSS) that detects the current position Po of the vehicle 200.

The actuator 220 operates each unit of the vehicle 200 based on a control signal input from the control device 110 to cause the vehicle 200 to automatically travel. The actuator 220 includes, for example, an accelerator actuator 221 that operates an accelerator, a brake actuator 222 that operates a brake, a steering actuator 223 that operates a steering device, and a shift actuator 224 that operates a shift change.

The pattern-with-a-beacon 120 includes a calibration pattern 121 captured by the camera 201 mounted on the in-vehicle camera calibration device 100 at the time of calibration, and a beacon 122 that transmits beacon information Ib by wireless communication. The calibration pattern 121 is, for example, a geometric pattern drawn on a road surface, and is configured by an arrangement of a plurality of markers of any shape, size, and color suitable for calibration of the camera 201.

The beacon 122 is, for example, a Bluetooth (registered trademark) low energy (BLE) beacon, and transmits a radio wave of the beacon information Ib by wireless communication. The beacon information Ib can include, for example, pattern information Ip related to the calibration pattern 121. The pattern information Ip includes, for example, information on the position of the calibration pattern 121. In addition, the pattern information Ip may include, for example, information on the shape, size, and color of the calibration pattern 121.

In addition, the beacon information Ib may include, for example, information on a calibration position Pc of the vehicle 200 suitable for calibration of the camera 201 and a waiting position Pw at which the vehicle 200 is caused to wait after calibration of the camera 201. It should be noted that when the vehicle 200 includes a plurality of receiving antennas 202 and each receiving antenna 202 includes an antenna array 202a, the beacon information Ib does not need to include the pattern information Ip. In this case, the beacon information Ib may include a special direction detection signal.

Figure 2:
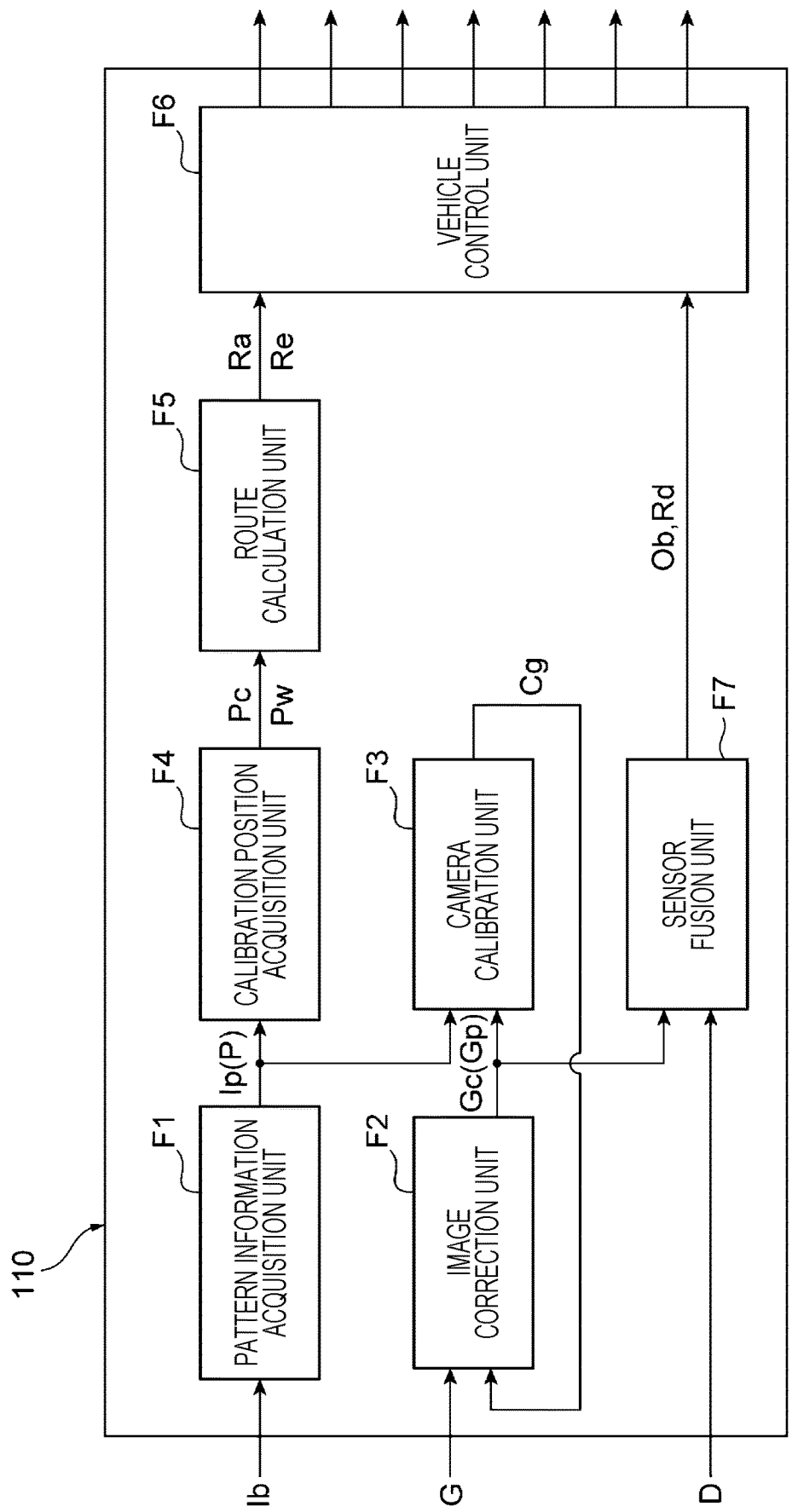
FIG. 2 is a functional block diagram of the control device constituting the in-vehicle camera calibration device in FIG. 1.

FIG. 2 is a functional block diagram of the control device 110 constituting the in-vehicle camera calibration device 100 in FIG. 1. The control device 110 includes, for example, a pattern information acquisition unit F1. In addition, the control device 110 includes, for example, an image correction unit F2 and a camera calibration unit F3. Furthermore, the control device 110 includes, for example, a calibration position acquisition unit F4, a route calculation unit F5, and a vehicle control unit F6. In addition, in the example shown in FIG. 2, the control device 110 includes a sensor fusion unit F7.

Each unit of the control device 110 shown in FIG. 2 indicates, for example, each function of the control device 110 achieved by causing the CPU 112 to execute a program stored in the memory 113 shown in FIG. 1. In the in-vehicle camera calibration device 100 of the present embodiment, the control device 110 calibrates the camera 201 based on the pattern image Gp that is the image G of the calibration pattern 121 acquired from the camera 201 and the beacon information Ib received through the receiving antenna 202 mounted on the vehicle 200.

Figure 3:
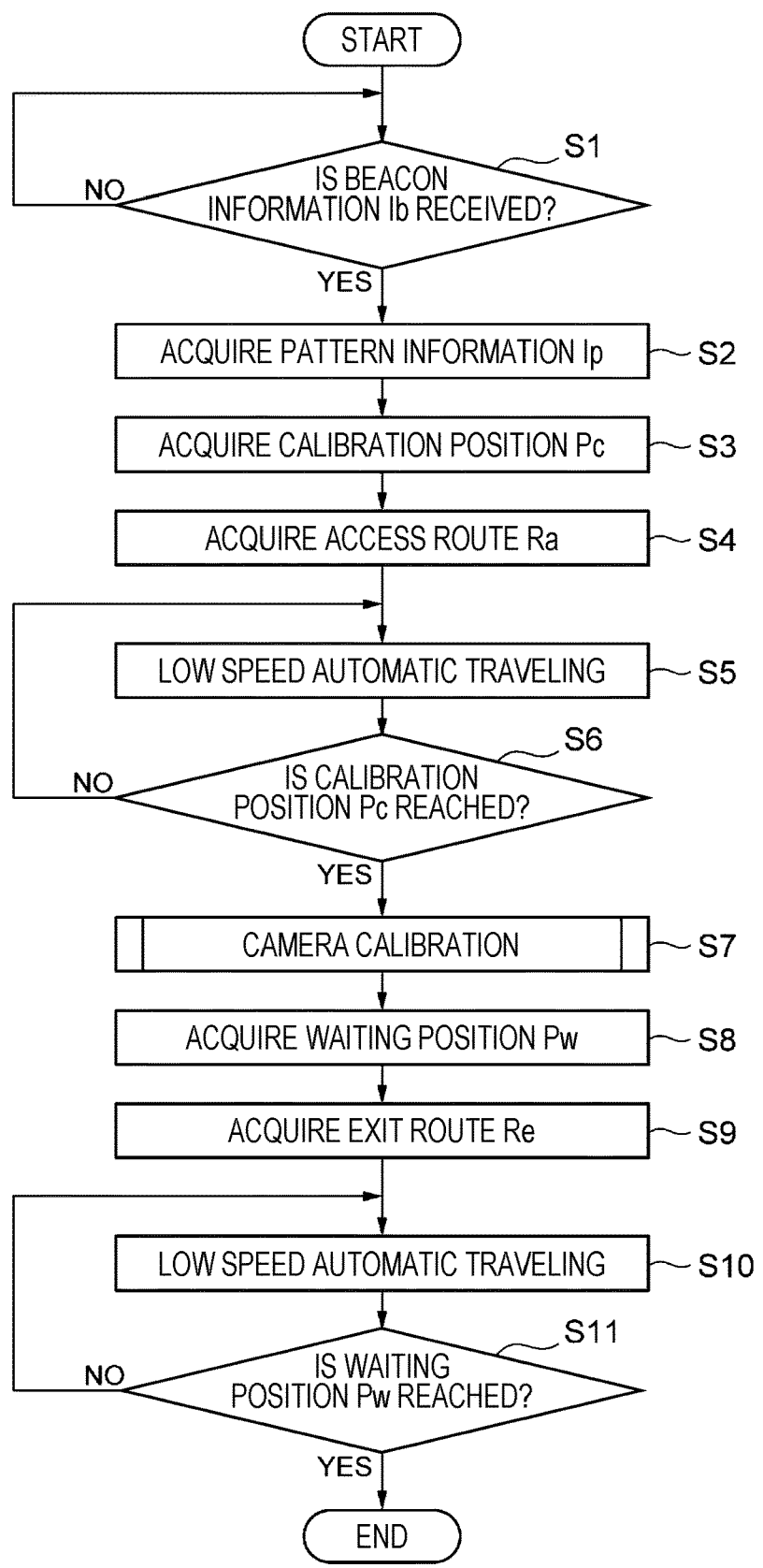
FIG. 3 is a flowchart showing a flow of processing by the control device in FIG. 2.
Figure 4:
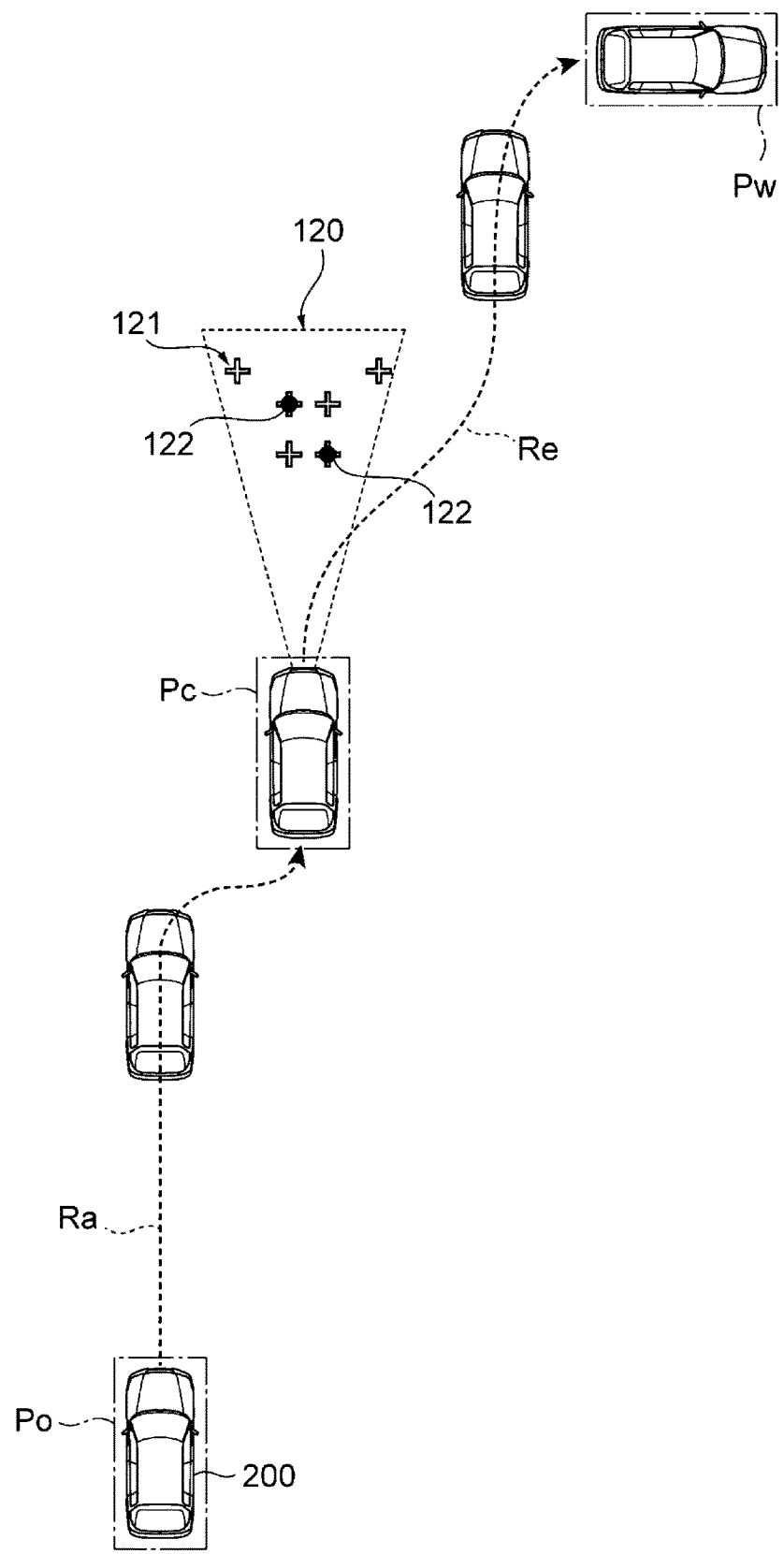
FIG. 4 is a plan view showing an operation of the vehicle mounted with the control device in FIG. 2.

Hereinafter, operations of the in-vehicle camera calibration device 100, the control device 110, and the pattern-with-a-beacon 120 of the present embodiment will be described with reference to FIGS. 3 and 4. FIG. 3 is a flowchart showing a flow of processing by the control device 110 shown in FIGS. 1 and 2. FIG. 4 is a plan view showing an operation of the vehicle 200 on which the control device 110 is mounted.

It should be noted that the processing flow shown in FIG. 3 may be periodically executed at all times when the activation switch of the vehicle 200 is turned on, or may be periodically executed only when the occupant of the vehicle 200 keeps the calibration mode of the camera 201 on.

When starting the processing flow in FIG. 3, the control device 110 executes processing S1 of determining whether or not the beacon information Ib transmitted from the beacon 122 of the pattern-with-a-beacon 120 has been received. In this processing S1, for example, when the beacon information Ib is not input from the receiving antenna 202 of the vehicle 200 to the pattern information acquisition unit F1, the control device 110 determines that the beacon information Ib has not been received (NO), and repeatedly executes this processing S1.

On the other hand, in this process S1, for example, when the beacon information Ib is input from the receiving antenna 202 to the pattern information acquisition unit F1, the control device 110 determines that the beacon information Ib has been received (YES) and executes processing S2 of acquiring the pattern information Ip. In this processing S2, the control device 110 causes the pattern information acquisition unit F1 to acquire the pattern information Ip included in the beacon information Ib, for example.

Here, the pattern information Ip includes, for example, information on the position P of the calibration pattern 121. In addition, the pattern information Ip may include, for example, information on the shape, size, and color of the calibration pattern 121. The pattern information Ip may include, for example, information on the position, shape, size, and color of an individual marker constituting the calibration pattern 121. As described above, when the beacon information Ib includes the pattern information Ip, the pattern information acquisition unit F1 acquires the pattern information Ip from the beacon information Ib.

In addition, when the beacon information Ib does not include the pattern information Ip, in the processing S2, the control device 110 causes the pattern information acquisition unit F1 to acquire the direction in which the plurality of antenna arrays 202a of the plurality of receiving antennas 202 have received the beacon information Ib. Then, the pattern information acquisition unit F1 acquires the position of the beacon 122 using the angle at which each antenna array 202a has received the beacon information Ib and the trigonometry.

Furthermore, for example, the pattern information acquisition unit F1 transmits the identification number of the beacon 122 included in the beacon information Ib to the server through the transmitter of the vehicle 200, and acquires the pattern information Ip corresponding to the identification number of the beacon 122 from the server through the receiver of the vehicle 200. As described above, even when the beacon information Ib does not include the pattern information Ip, the pattern information acquisition unit F1 can acquire the pattern information Ip including the position P, the shape, the size, the color, and the like of the calibration pattern 121.

After the pattern information acquisition unit F1 acquires the pattern information Ip in processing S2, the control device 110 executes processing S3 of acquiring the calibration position Pc of the camera 201. In this processing S3, for example, the control device 110 causes the calibration position acquisition unit F4 to acquire the calibration position Pc of the vehicle 200 suitable for calibration of the camera 201. For example, when the calibration position Pc is included in the pattern information Ip, the calibration position acquisition unit F4 acquires the calibration position Pc from the pattern information Ip.

In addition, when the calibration position Pc is not included in the pattern information Ip, the calibration position acquisition unit F4 acquires the calibration position Pc based on, for example, the position P of the calibration pattern 121 acquired in the previous processing S2 and the distance and direction suitable for calibration stored in the memory 113. When ending the processing S3 of acquiring the calibration position Pc, the control device 110 executes processing S4 of acquiring the access route Ra.

In this processing S4, the control device 110 causes the route calculation unit F5 to calculate the access route Ra from the current position Po of the vehicle 200 to the calibration position Pc, for example. The route calculation unit F5 outputs the calculated access route Ra to the vehicle control unit F6. Thereafter, the control device 110 executes low speed automatic traveling processing S5.

In this processing S5, for example, the control device 110 causes the vehicle control unit F6 to cause the vehicle 200 to travel from the current position Po to the calibration position Pc along the access route Ra as shown in FIG. 4. Specifically, the vehicle control unit F6 controls the accelerator actuator 221, the brake actuator 222, the steering actuator 223, the shift actuator 224, and the like to cause the vehicle 200 to travel along the access route Ra at a predetermined speed.

In this processing S5, for example, the control device 110 causes the sensor fusion unit F7 to integrate the corrected image Gc of the image correction unit F2 and the detection results D by other external sensors and the vehicle sensor 210 and to output the detection results of the obstacle Ob, the road Rd, and the like around the vehicle 200 to the vehicle control unit F6. Then, the vehicle control unit F6 causes the vehicle 200 to travel along the access route Ra using the detection results input from the sensor fusion unit F7.

Specifically, for example, when another vehicle is stopped ahead of the vehicle 200 traveling along the access route Ra, the vehicle control unit F6 stops the vehicle 200 based on the detection result of the other vehicle by the sensor fusion unit F7. In addition, when the sensor fusion unit F7 detects the forward movement of another vehicle ahead, the vehicle control unit F6 restarts the low speed automatic traveling of the vehicle 200 along the access route Ra.

Next, the control device 110 causes the vehicle control unit F6 to execute processing S6 of determining whether or not the vehicle 200 has reached the calibration position Pc. In this processing S6, when determining that the vehicle 200 has not reached the calibration position Pc (NO), the vehicle control unit F6 continues the low speed automatic traveling processing S5.

On the other hand, in the processing S6, when determining that the vehicle 200 has reached the calibration position Pc (YES), the vehicle control unit F6 stops the vehicle 200 and ends the low speed automatic traveling processing S5. Thereafter, the control device 110 causes the camera calibration unit F3 to execute the camera calibration processing S7, for example.

Figure 5:
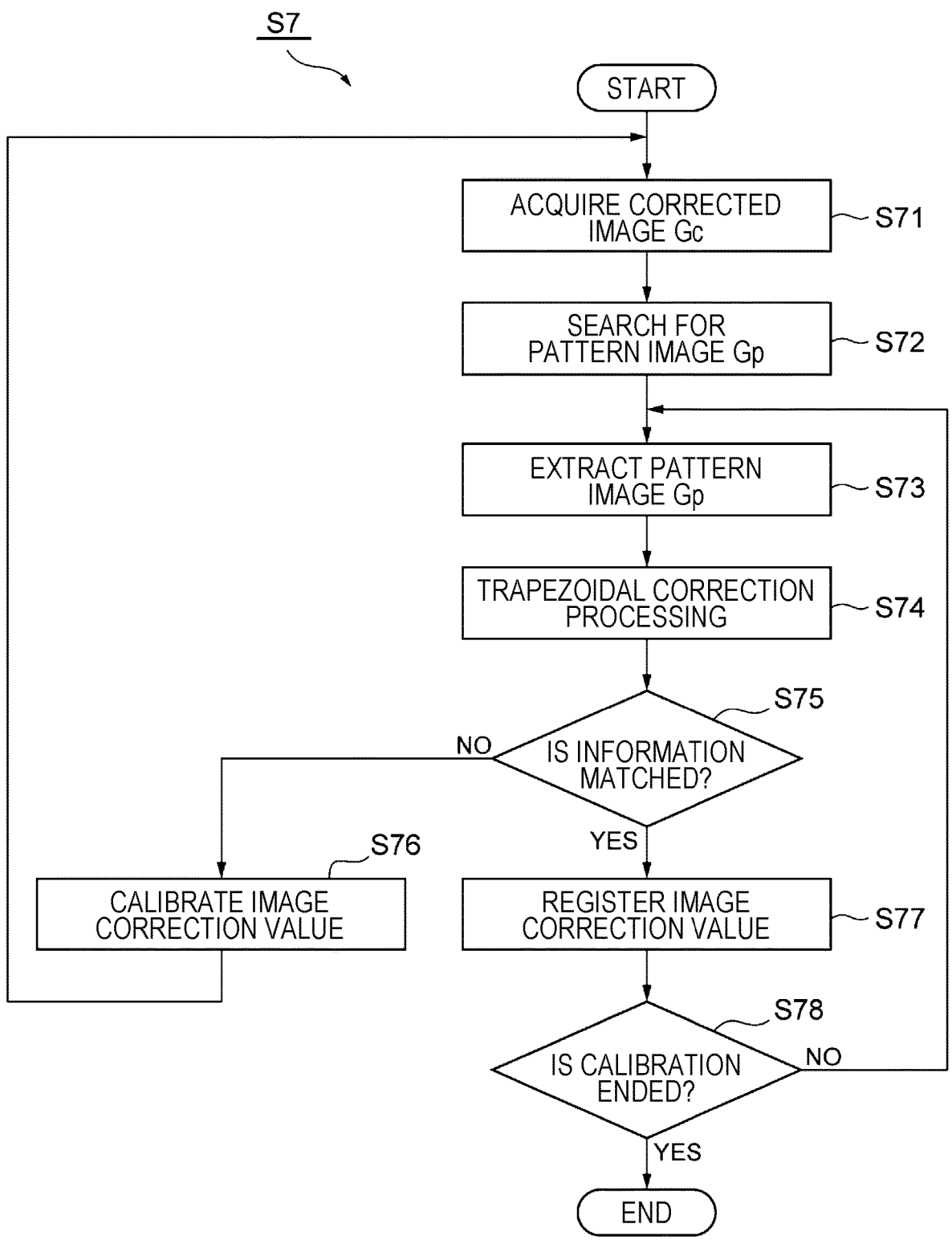
FIG. 5 is a flowchart showing details of the camera calibration processing in FIG. 3.

FIG. 5 is a flowchart showing details of the camera calibration processing S7 in FIG. 3. When the processing S7 shown in FIG. 5 is started, the control device 110 causes the camera calibration unit F3 to execute processing S71 of acquiring the corrected image Gc including the pattern image Gp that is the image of the calibration pattern 121 from the image correction unit F2, for example. Next, the control device 110 causes the camera calibration unit F3 to execute processing S72 of searching for the pattern image Gp, for example.

In this processing S72, the camera calibration unit F3 limits the search range of the pattern image Gp in the corrected image Gc based on the position P of the calibration pattern 121 included in the pattern information Ip input from the pattern information acquisition unit F1, for example. Next, the control device 110 causes the camera calibration unit F3 to execute processing S73 of extracting the pattern image Gp, for example.

In this processing S73, the camera calibration unit F3 extracts and cuts out one marker constituting the calibration pattern 121 from the pattern image Gp detected by the search in the previous processing S72. Next, the control device 110 causes the camera calibration unit F3 to execute trapezoidal correction processing S74 of the marker cut out from the pattern image Gp, for example.

Next, the control device 110 executes processing S75 of determining whether or not the information on the calibration pattern 121 included in the pattern information Ip matches the information on the calibration pattern 121 based on the pattern image Gp. In this processing S75, the camera calibration unit F3 compares, for example, information on one marker of the pattern image Gp subjected to the trapezoidal correction in the previous processing with information on one marker of the calibration pattern 121 included in the pattern information Ip corresponding to the marker.

For example, when pieces of information on the shape, size, and color of the markers compared in the processing S75 do not match each other, the camera calibration unit F3 determines that the information on the calibration pattern 121 included in the pattern information Ip does not match the information on the calibration pattern 121 based on the pattern image Gp (NO). In this case, the camera calibration unit F3 executes processing S76 of calibrating the image correction value Cg of the image correction unit F2 based on, for example, the pattern information Ip acquired from the pattern information acquisition unit F1 and the pattern image Gp included in the corrected image Gc acquired from the image correction unit F2.

In this processing S76, the camera calibration unit F3 calibrates the image correction value Cg of the image correction unit F2 so that, for example, the information on the calibration pattern 121 included in the pattern information Ip matches the information on the calibration pattern 121 based on the pattern image Gp. Thereafter, the camera calibration unit F3 applies the calibrated image correction value Cg to the image correction unit F2, and executes processing S71 of acquiring the corrected image Gc from the image correction unit F2 again.

On the other hand, for example, when pieces of information on the shape, size, and color of the markers compared in the processing S75 match each other, the camera calibration unit F3 determines that the pattern information Ip that is the information on the calibration pattern 121 matches the information on the calibration pattern 121 based on the pattern image Gp (YES). In this case, the camera calibration unit F3 executes processing S77 of registering the image correction value Cg of the image correction unit F2 in the memory 113.

Thereafter, the control device 110 causes the camera calibration unit F3 to execute processing S78 of determining whether or not the calibration of the camera 201 has been ended, for example. In this processing S78, the camera calibration unit F3 determines whether or not the processing S73 has been executed on all the markers constituting the calibration pattern 121. When determining that the processing S73 has not been executed on all the markers (NO), the camera calibration unit F3 executes the processing S73 on the next marker.

On the other hand, when the camera calibration unit F3 determines that the processing S73 has been executed on all the markers (YES), the control device 110 ends the camera calibration processing S7 shown in FIG. 5, for example, and executes the processing S8 of acquiring the waiting position Pw as shown in FIG. 3. Here, as described above, the waiting position Pw is a position at which the vehicle 200 is caused to wait after the calibration of the camera 201.

In this processing S8, the calibration position acquisition unit F4 acquires, for example, the waiting position Pw included in the beacon information Ib. Thereafter, the control device 110 executes, for example, processing S9 of acquiring the exit route Re. In this processing S9, for example, as shown in FIG. 4, the route calculation unit F5 calculates the exit route Re from the calibration position Pc to the waiting position Pw and outputs the calculated result to the vehicle control unit F6. Next, the control device 110 causes the vehicle control unit F6 to execute processing S10 of causing the vehicle to travel from the calibration position Pc to the waiting position Pw along the exit route Re, for example.

In this processing S10, for example, the control device 110 causes the sensor fusion unit F7 to integrate the corrected image Gc of the image correction unit F2 and the detection results D by other external sensors and the vehicle sensor 210 and to output the detection results of the obstacle Ob, the road Rd, and the like around the vehicle 200 to the vehicle control unit F6. Then, the vehicle control unit F6 causes the vehicle 200 to travel along the exit route Re using the detection results input from the sensor fusion unit F7.

Specifically, for example, when another vehicle is stopped ahead of the vehicle 200 traveling along the exit route Re, the vehicle control unit F6 stops the vehicle 200 based on the detection result of the other vehicle by the sensor fusion unit F7. In addition, when the sensor fusion unit F7 detects the forward movement of another vehicle ahead, the vehicle control unit F6 restarts the low speed automatic traveling of the vehicle 200 along the exit route Re.

Next, the control device 110 causes the vehicle control unit F6 to execute processing S11 of determining whether or not the vehicle 200 has reached the waiting position Pw. In this processing S11, when determining that the vehicle 200 has not reached the waiting position Pw (NO), the vehicle control unit F6 continues the low speed automatic traveling processing S10. On the other hand, in the processing S11, when determining that the vehicle 200 has reached the waiting position Pw (YES), the vehicle control unit F6 stops the vehicle 200 and ends the processing flow shown in FIG. 3.

Hereinafter, actions of the in-vehicle camera calibration device 100, the control device 110, and the pattern-with-a-beacon 120 according to the present embodiment will be described.

As described above, the in-vehicle camera calibration device 100 of the present embodiment includes a control device 110 to be mounted on a vehicle 200 and a pattern-with-a-beacon 120 to be installed outside the vehicle 200. The pattern-with-a-beacon 120 includes a calibration pattern 121 captured by the camera 201 mounted on the vehicle 200 at the time of calibration, and a beacon 122 that transmits beacon information Ib by wireless communication. The control device 110 calibrates the camera 201 based on the pattern image Gp that is the image of the calibration pattern 121 acquired from the camera 201 and the beacon information Ib received through the receiving antenna 202 mounted on the vehicle 200.

With such a configuration, the in-vehicle camera calibration device 100 of the present embodiment can acquire the information on the calibration pattern 121 based on the beacon information Ib acquired by the control device 110. Furthermore, the in-vehicle camera calibration device 100 can cause the control device 110 to calibrate the camera 201 by comparing the information on the calibration pattern 121 based on the beacon information Ib with the information on the calibration pattern 121 based on the pattern image Gp. Therefore, according to the in-vehicle camera calibration device 100 of the present embodiment, it is possible to perform calibration of the camera 201 mounted on the vehicle 200 more accurately and easily.

As a result, according to the in-vehicle camera calibration device 100 of the present embodiment, it is possible to prevent a measurement error from occurring in the camera 201 caused by an error in the mounting position of the camera 201, a change over time of the camera 201, a change in the attitude of the vehicle 200 due to a load or the number of occupants, and the like. In addition, at the time of setting up the camera 201 in the manufacturing factory of the vehicle 200 or the dealer of the vehicle 200, it is possible to perform calibration of the camera 201 more accurately and easily.

In addition, in the in-vehicle camera calibration device 100 of the present embodiment, the control device 110 includes the pattern information acquisition unit F1 that acquires the pattern information Ip included in the beacon information Ib. In addition, the pattern information Ip includes information on the position of the calibration pattern 121.

With such a configuration, the in-vehicle camera calibration device 100 of the present embodiment can cause the control device 110 to acquire the pattern information Ip from the beacon information Ib and acquire the information on the position of the calibration pattern 121 included in the pattern information Ip. Accordingly, the in-vehicle camera calibration device 100 can cause the control device 110 to calibrate the camera 201 by comparing the information on the position of the calibration pattern 121 based on the beacon information Ib with the information on the position of the calibration pattern 121 based on the pattern image Gp.

In addition, in the in-vehicle camera calibration device 100 of the present embodiment, the control device 110 may include the pattern information acquisition unit F1 that acquires the pattern information Ip including the positions of the beacon 122 and the calibration pattern 121 based on the direction in which the plurality of antenna arrays 202a included in the receiving antenna 202 have received the beacon information Ib.

With such a configuration, even when the beacon information Ib does not include the pattern information Ip, the in-vehicle camera calibration device 100 of the present embodiment can acquire the information on the position of the calibration pattern 121 based on the direction in which the plurality of antenna arrays 202a receive the beacon information Ib. Accordingly, the in-vehicle camera calibration device 100 can cause the control device 110 to calibrate the camera 201 by comparing the information on the position of the calibration pattern 121 based on the beacon information Ib with the information on the position of the calibration pattern 121 based on the pattern image Gp.

In addition, in the in-vehicle camera calibration device 100 of the present embodiment, the control device 110 includes the image correction unit F2 that corrects the image G of the camera 201 and outputs the corrected image Gc, and the camera calibration unit F3 that calibrates the image correction value Cg of the image correction unit F2. The camera calibration unit F3 calibrates the image correction value Cg based on the pattern information Ip acquired from the pattern information acquisition unit F1 and the pattern image Gp included in the corrected image Gc acquired from the image correction unit F2.

With such a configuration, the in-vehicle camera calibration device 100 of the present embodiment can calibrate the camera 201 by comparing the pattern information Ip acquired from the pattern information acquisition unit F1 with the pattern image Gp included in the corrected image Gc acquired from the image correction unit F2. Therefore, according to the in-vehicle camera calibration device 100 of the present embodiment, it is possible to perform calibration of the camera 201 mounted on the vehicle 200 more accurately and easily.

In addition, in the in-vehicle camera calibration device 100 of the present embodiment, the camera calibration unit F3 of the control device 110 limits the search range of the pattern image Gp in the corrected image Gc based on the position P of the calibration pattern 121 included in the pattern information Ip.

With such a configuration, when the camera calibration unit F3 of the control device 110 searches for the pattern image Gp from the corrected image Gc, the in-vehicle camera calibration device 100 of the present embodiment can reduce the processing load and perform the search at high speed and in a short time as compared with the case of searching the entire corrected image Gc. Therefore, according to the in-vehicle camera calibration device 100 of the present embodiment, it is possible to perform calibration of the camera 201 mounted on the vehicle 200 more accurately and easily.

In addition, in the in-vehicle camera calibration device 100 of the present embodiment, the control device 110 includes the calibration position acquisition unit F4 that acquires the calibration position Pc of the vehicle 200 suitable for calibration of the camera 201, the route calculation unit F5 that calculates the access route Ra from the current position Po of the vehicle 200 to the calibration position Pc, and the vehicle control unit F6 that causes the vehicle 200 to travel from the current position Po to the calibration position Pc along the access route Ra.

With such a configuration, the in-vehicle camera calibration device 100 of the present embodiment causes the control device 110 to enable the vehicle 200 to move to the calibration position Pc suitable for calibration of the camera 201, and to enable the camera 201 to photograph the calibration pattern 121. Therefore, according to the in-vehicle camera calibration device 100 of the present embodiment, it is possible to perform calibration of the camera 201 mounted on the vehicle 200 more accurately and easily.

In addition, in the in-vehicle camera calibration device 100 of the present embodiment, the calibration position acquisition unit F4 acquires the waiting position Pw at which the vehicle 200 is caused to wait after the calibration of the camera 201. In addition, the route calculation unit F5 calculates the exit route Re from the calibration position Pc to the waiting position Pw. The vehicle control unit F6 causes the in-vehicle camera calibration device 100 to travel from the calibration position Pc to the waiting position Pw along the exit route Re after calibration of the camera 201.

With such a configuration, the in-vehicle camera calibration device 100 of the present embodiment can move the vehicle 200 on which calibration of the camera 201 has been ended to the waiting position Pw. Accordingly, the in-vehicle camera calibration device 100 can efficiently calibrate cameras 201 of a plurality of vehicles 200.

In addition, the control device 110 of the present embodiment is an electronic control device that is mounted on the vehicle 200 and calibrates the camera 201 mounted on the vehicle 200 in cooperation with the pattern-with-a-beacon 120 installed outside the vehicle 200. The pattern-with-a-beacon 120 includes a calibration pattern 121 captured by the camera 201 mounted on the vehicle 200 at the time of calibration, and a beacon 122 that transmits beacon information Ib by wireless communication. The control device 110 calibrates the camera 201 based on the pattern image Gp that is the image of the calibration pattern 121 acquired from the camera 201 and the beacon information Ib received through the receiving antenna 202 mounted on the vehicle 200.

With such a configuration, according to the control device 110 of the present embodiment, the information on the calibration pattern 121 can be acquired based on the beacon information Ib. Accordingly, the control device 110 can calibrate the camera 201 by comparing the information on the calibration pattern 121 based on the beacon information Ib with the information on the calibration pattern 121 based on the pattern image Gp. Therefore, according to the control device 110 of the present embodiment, it is possible to perform calibration of the camera 201 mounted on the vehicle 200 more accurately and easily.

In addition, the pattern-with-a-beacon 120 of the present embodiment is a structure installed outside the vehicle 200. The pattern-with-a-beacon 120 includes a calibration pattern 121 to be captured by the camera 201 mounted on the vehicle 200, and a beacon 122 that transmits beacon information Ib used by the control device 110 mounted on the vehicle 200 at the time of calibration of the camera 201 by wireless communication.

With such a configuration, according to the pattern-with-a-beacon 120 of the present embodiment, by transmitting the beacon information Ib to the control device 110 mounted on the vehicle 200, the control device 110 can acquire the information on the calibration pattern 121 based on the beacon information Ib. Accordingly, the control device 110 can calibrate the camera 201 by comparing the information on the calibration pattern 121 based on the beacon information Ib with the information on the calibration pattern 121 based on the pattern image Gp. Therefore, according to the pattern-with-a-beacon 120 of the present embodiment, it is possible to perform calibration of the camera 201 mounted on the vehicle 200 more accurately and easily.

As described above, the embodiments of the in-vehicle camera calibration device, the control device, and the pattern-with-a-beacon according to the present disclosure have been described in detail with reference to the drawings, but the concrete configuration is not limited to the embodiments, and any design change or the like in a scope without departing from the gist of the present disclosure is included in the present disclosure. Hereinafter, a modification of the above-described embodiment will be described with reference to FIG. 6.

Figure 6:
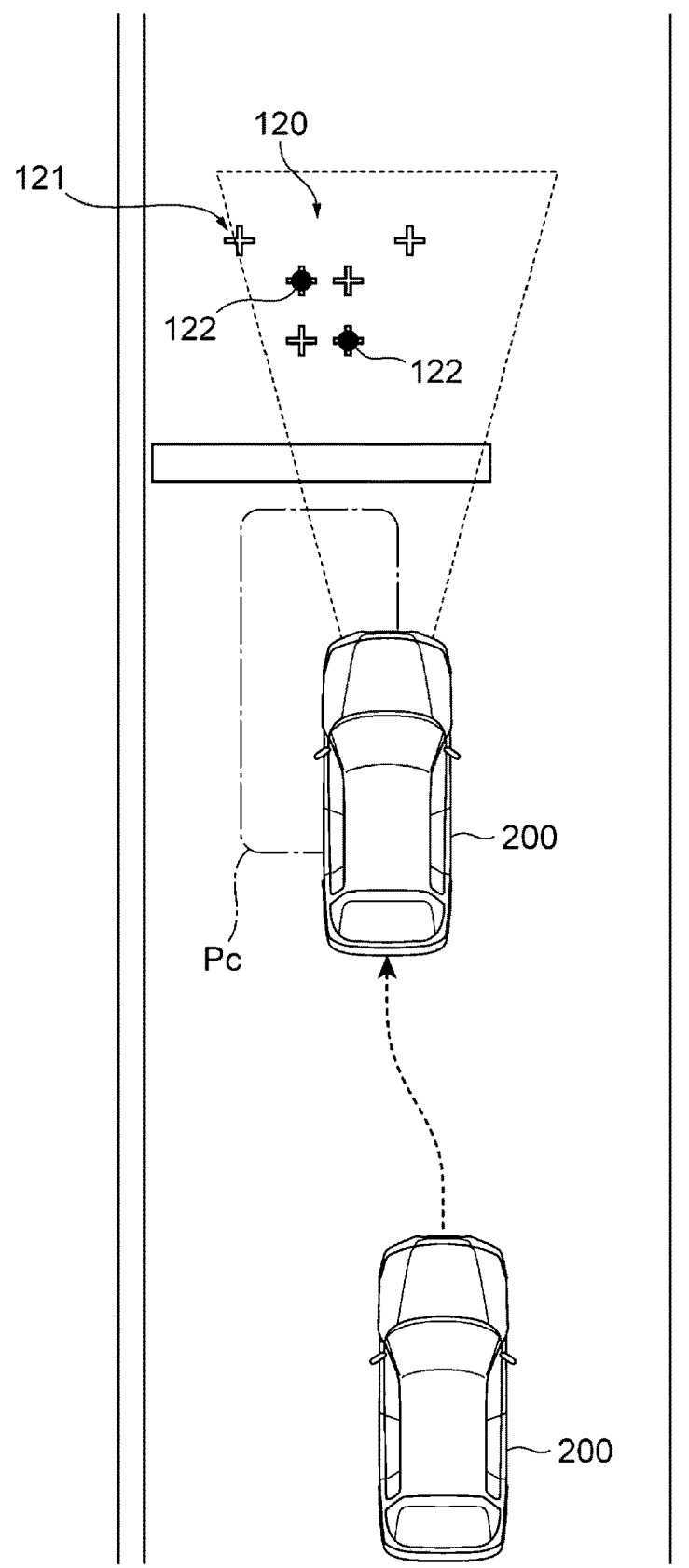
FIG. 6 is a plan view showing a modification of the embodiment in FIGS. 1 to 5.

FIG. 6 is a plan view showing a modification of the above-described embodiment. As shown in FIG. 6, the pattern-with-a-beacon 120 may be arranged in front of a stop line of a general road, for example. In addition, the pattern-with-a-beacon 120 may include a plurality of beacons 122. In addition, the control device 110 may calibrate the camera 201 when the vehicle 200 is positioned within a range of a predetermined distance from the calibration position Pc.

REFERENCE SIGNS LIST 100 in-vehicle camera calibration device
110 control device
120 pattern-with-a-beacon
121 calibration pattern
122 beacon
200 vehicle
201 camera
202 receiving antenna
202a antenna array
Cg image correction value
F1 pattern information acquisition unit
F2 image correction unit
F3 camera calibration unit
F4 calibration position acquisition unit
F5 route calculation unit
F6 vehicle control unit
G image
Gc corrected image
Gp pattern image
Ib beacon information
Ip pattern information
Pc calibration position
Po current position
Pw waiting position
Ra access route
Re exit route

The invention claimed is:

1. An in-vehicle camera calibration device comprising:
a control device to be mounted on a vehicle; and
a pattern-with-a-beacon to be installed outside the vehicle,
wherein the pattern-with-a-beacon includes:
a calibration pattern to be captured by a camera mounted on the vehicle at a time of calibration; and
a beacon configured to transmit beacon information by wireless communication,
wherein the control device calibrates the camera based on a pattern image being an image of the calibration pattern acquired from the camera and the beacon information received through a receiving antenna mounted on the vehicle,
wherein the control device includes:
a pattern information acquirer that acquires pattern information included in the beacon information,
an image corrector that corrects an image of the camera and outputs a corrected image, and
a camera calibrator that calibrates an image correction value of the image corrector, and
wherein:
the pattern information includes information on a position of the calibration pattern, and
the camera calibrator calibrates the image correction value based on the pattern information acquired from the pattern information acquirer and the pattern image included in the corrected image acquired from the image corrector.

2. The in-vehicle camera calibration device according to claim 1, wherein the control device includes a pattern information acquirer that acquires pattern information including positions of the beacon and the calibration pattern based on a direction in which a plurality of antenna arrays included in the receiving antenna receives the beacon information.

3. The in-vehicle camera calibration device according to claim 1, wherein the camera calibrator limits a search range of the pattern image in the corrected image based on the position of the calibration pattern included in the pattern information.

4. The in-vehicle camera calibration device according to claim 1, wherein the control device includes:
a calibration position acquirer that acquires a calibration position of the vehicle suitable for calibration of the camera;
a route calculator that calculates an access route from a current position of the vehicle to the calibration position; and
a vehicle controller that causes the vehicle to travel from the current position to the calibration position along the access route.

5. The in-vehicle camera calibration device according to claim 4, wherein
the calibration position acquirer acquires a waiting position at which the vehicle is caused to wait after calibration of the camera,
the route calculator calculates an exit route from the calibration position to the waiting position, and
the vehicle controller causes the vehicle to travel from the calibration position to the waiting position along the exit route after calibration of the camera.

6. A control device that is mounted on a vehicle and calibrates a camera mounted on the vehicle in cooperation with a pattern-with-a-beacon to be installed outside the vehicle, comprising:
a calibration position acquirer that acquires a calibration position of the vehicle suitable for calibration of the camera;
a route calculator that calculates an access route from a current position of the vehicle to the calibration position; and
a vehicle controller that causes the vehicle to travel from the current position to the calibration position along the access route, wherein
the pattern-with-a-beacon includes:
- a calibration pattern captured by a camera mounted on the vehicle at a time of calibration; and
- a beacon that transmits beacon information by wireless communication, wherein the control device calibrates the camera based on a pattern image being an image of the calibration pattern acquired from the camera and the beacon information received through a receiving antenna mounted on the vehicle.

7. A pattern-with-a-beacon to be installed outside a vehicle, the pattern-with-a-beacon comprising:
- a calibration pattern to be captured by a camera mounted on the vehicle; and
- a beacon configured to transmit, by wireless communication, beacon information to be used by a control device mounted on the vehicle at a time of calibration of the camera, wherein the control device calibrates the camera based on a pattern image being an image of the calibration pattern acquired from the camera and the beacon information received through a receiving antenna mounted on the vehicle, wherein the control device includes:
- a pattern information acquirer that acquires pattern information included in the beacon information,
- an image corrector that corrects an image of the camera and outputs a corrected image, and
- a camera calibrator that calibrates an image correction value of the image corrector, and wherein:
the pattern information includes information on a position of the calibration pattern, and
the camera calibrator calibrates the image correction value based on the pattern information acquired from the pattern information acquirer and the pattern image included in the corrected image acquired from the image corrector.

* * * * *